US 8,812,856 B2

(12) United States Patent
Tamma

(10) Patent No.: US 8,812,856 B2
(45) Date of Patent: Aug. 19, 2014

(54) METHODS AND SYSTEMS FOR STATE SYNCHRONIZATION OVER A NON-RELIABLE NETWORK USING SIGNATURE PROCESSING

(75) Inventor: Leela Tamma, Fremont, CA (US)

(73) Assignee: Zynga Inc., San Francisco, CA (US)

( * ) Notice: Subject to any disclaimer, the term of this patent is extended or adjusted under 35 U.S.C. 154(b) by 272 days.

(21) Appl. No.: 13/371,365

(22) Filed: Feb. 10, 2012

(65) Prior Publication Data

US 2013/0212396 A1 Aug. 15, 2013

(51) Int. Cl.
*H04L 9/32* (2006.01)
*H04L 29/08* (2006.01)
*H04L 29/06* (2006.01)

(52) U.S. Cl.
CPC ........ *H04L 67/142* (2013.01); *H04L 29/06034* (2013.01); *H04L 63/12* (2013.01)
USPC .................. 713/176; 709/228; 726/4; 463/29

(58) Field of Classification Search
CPC ... G06F 21/64; H04L 63/1416; H04L 9/3247; H04L 63/105; G01V 3/081
See application file for complete search history.

(56) References Cited

U.S. PATENT DOCUMENTS

| | | | | |
|---|---|---|---|---|
| 8,403,755 B2* | 3/2013 | Kerr | ................................. | 463/42 |
| 2002/0034299 A1* | 3/2002 | Charrin | ......................... | 380/251 |
| 2002/0073139 A1* | 6/2002 | Hawkins et al. | .............. | 709/201 |
| 2002/0161742 A1* | 10/2002 | Heiden et al. | ..................... | 707/1 |
| 2005/0060248 A1* | 3/2005 | O'Neal | ........................ | 705/30 |
| 2008/0267189 A1* | 10/2008 | Li | ................................ | 370/392 |
| 2010/0217852 A1* | 8/2010 | Nishida | ........................ | 709/223 |
| 2013/0279516 A1* | 10/2013 | Shi | ................................ | 370/464 |

* cited by examiner

*Primary Examiner* — Gilberto Barron, Jr.
*Assistant Examiner* — Abdulhakim Nobahar
(74) *Attorney, Agent, or Firm* — Martine Penilla Group, LLP

(57) ABSTRACT

Systems and methods for facilitating confirmation of completion of a transaction(s) for state synchronization over a non reliable network using signature processing are described. One of the methods includes receiving a read request from a first client, sending a last known signature with a context object to the first client in response to receiving the read request, and receiving an appended signature from the first client with a context object for a transaction at the first client. The appended signature includes the last known signature and an increment by the first client. The operation of receiving the appended signature occurs upon execution of the transaction at the first client. The method further includes updating the last known signature to the appended signature and sending the updated last known signature to the first client to facilitate marking of the transaction as complete resulting in a definitive state synchronization.

20 Claims, 10 Drawing Sheets

METHODS AND SYSTEMS FOR STATE SYNCHRONIZATION OVER A NON-RELIABLE NETWORK USING SIGNATURE PROCESSING

BACKGROUND

1. Field of the Invention

The present invention relates to methods and systems for efficient and deterministic state synchronization over a non-reliable network using signature processing.

2. Description of the Related Art

With the advancement of Internet, client devices, such as cell phones and tablets have gained popularity. For example, some households have multiple client devices. As another example, some offices provide multiple client devices for their employees.

A user may use an application at one client device and use the application at another client device or re-use the application at the same client device. Between uses of the application at the same or different client devices, information regarding a state of the application should be communicated efficiently. Also, a variety of fraudulent applications may try to gain access to the information that is stored within a network.

It is within this context that embodiments of the present invention arise.

SUMMARY

Embodiments of the present invention provide methods and systems for communicating signatures to improve efficiency within a network. In some embodiments, an appended signature is communicated from a client to a server. The appended signature is communicated when a transaction occurs at the client. The occurrence of the transaction changes a state of the client. The server stores the appended signature as a last known signature at the server and communicates the last known signature to other clients that issue a read request to the server. The communication of the appended signature notifies the other clients regarding the client at which the transaction occurred. Moreover, the appended signature that identifies the client that issues the read request also helps the server and the other clients determine whether the client is fraudulent.

In some embodiments, a method for facilitating confirmation of completion of a transaction is described. The method includes receiving a read request from a first client, sending a last known signature with a context object to the first client in response to receiving the read request, and receiving an appended signature from the first client with a context object for a transaction at the first client. The appended signature includes the last known signature and an increment by the first client. The operation of receiving the appended signature occurs upon execution of the transaction at the first client. The method further includes updating the last known signature to the appended signature and sending the updated last known signature to the first client to facilitate marking of the transaction as complete.

In some embodiments, a method for confirming completion of a transaction is described. The method includes sending a read request to a server, receiving, at a first client, last known signature with a context object from the server in response to sending the read request, and determining whether a transaction is performed. The method further includes sending an appended signature with a context object to the server in response to determining that the transaction is performed. The appended signature includes the last known signature and an increment by the first client. The method includes determining whether the appended signature is received from the server.

In one embodiment, a method for confirming completion of a transaction is described. The method includes sending a read request to a server, receiving a last known signature with a context object in response to sending the read request, determining whether a transaction is complete at a first client, and adding an increment signature to the last known signature in response to determining the transaction is complete. The operation of adding the increment is performed to generate an appended signature. The method further includes sending the appended signature with a context object to the server and sending a signature to the first client.

Other aspects of the invention will become apparent from the following detailed description, taken in conjunction with the accompanying drawings, illustrating by way of example the principles of various embodiments of the present invention.

BRIEF DESCRIPTION OF THE DRAWINGS

Various embodiments of the present invention may best be understood by reference to the following description taken in conjunction with the accompanying drawings.

DETAILED DESCRIPTION

Figure 1:
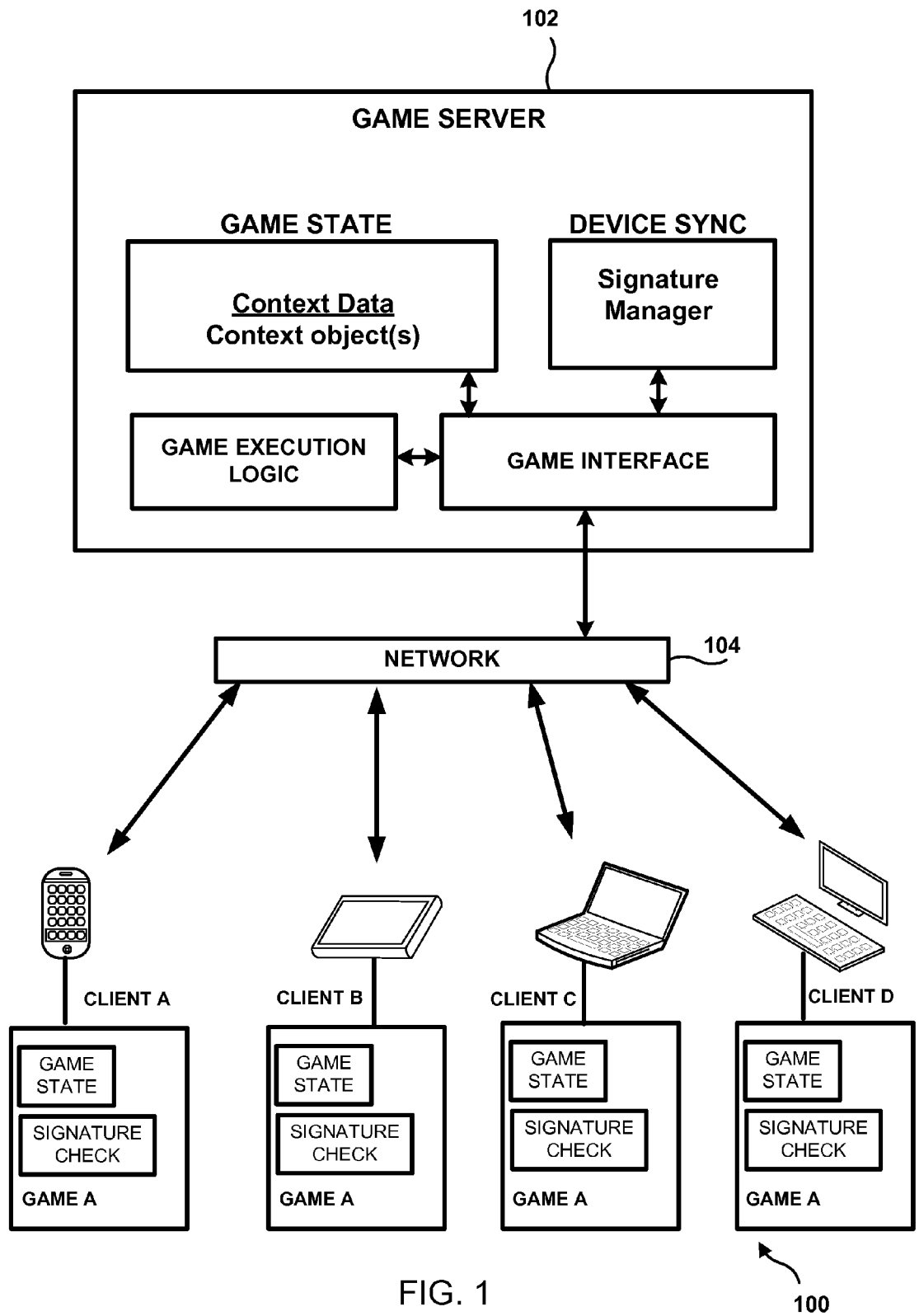
FIG. 1 is a diagram of an architecture for playing a game and for facilitating confirmation of completion of a transaction, in accordance with one embodiment of the present invention.

It should be noted that various embodiments of the present invention may be practiced without some or all of these specific details. In other instances, well known process operations have not been described in detail in order not to unnecessarily obscure various embodiments of the present invention.

In one example embodiment, each client is assigned an identifier, such as a bit, a bit pattern, or a token, upon registration of the client with a server or installation of the client at the server or at a client device. As one example, this identifier may be a random generated number, or can be a bit combination based on the number of clients registered with the server. A client is, for example, a game application that is executed to play a game. An example of the game includes an online game that is displayed on a display device of a client device, where the client device connects to the server to play a game and the server maintains or tracks a user's progress through the game. Aspects of the defined methods and systems will therefore provide for efficient state synchronization over a non-reliable network with the help of signatures. The non-reliable network can be due to loss of connection, or connection drops during mobile device processing as the device moves. A display device is described below. A server, as used herein, is a physical machine or a virtual machine.

Broadly speaking, the progress can be thought of as a current game state. As can be appreciated, maintaining correct synchronization of game state between the client device or client devices and the server, ensures that the user does not lose his or her progress in a game during game play on one client device or when the user logs into the server with another client device.

In some embodiments, the user logs in to a server, and upon logging in, a client, such as client 1, retrieves a server side object. The server side object includes a last known signature that is known to the server (LKS(s)). The last known signature LKS(s) when received by a client becomes the LKS of the client (LKS(c)), which is saved internally within the client. If after occurrence of a transaction at the client 1, the client 1 attempts a write to the server, the write includes sending a combination of the LKS(c) and an increment signature, which is described below.

The server is written to, but a failure occurs when the server sends the confirmation of the write. The client 1 does not know that the server correctly handled the write. At a later point in time when client 1 successfully connects to the server, client 1 issues a read request. In some embodiments, a client sends an increment signature of the client in the read request to identify the client to the server. For example, the client 1 sends an increment signature having a value of "1" in a read request to the server. As another example, a client 2 sends an increment signature having a value of "2" in a read request to the server 102.

Upon receiving the read request from the client 1, the server sends client 1 the last known signature held by the server LKS(s). In some embodiments, before sending the last known signature LKS(s) to a client that issues a read request, the server determines whether the increment signature received from the client is registered with the server. In these embodiments, upon determining that the increment signature is not registered, the server generates a warning, such as issues a notification to other clients, such as client 2, regarding the client that issued the read request. On the other hand, upon determining that the increment signature is registered, the server sends the LKS(s) to the client that issued the read request.

If the combination of the LKS(c) and the increment signature sent from the client 1 matches the LKS(s) obtained from the server, the client 1 knows that the server performed the requested write and updates its state confirming that the server committed the write. If the combination stored at client 1 does not match the LKS(s) obtained from the server, the client 1 takes the LKS(s) as its current state, and will proceed from that point forward.

FIG. 1 is a diagram of an embodiment of an architecture 100 for playing a game and for facilitating confirmation of completion of a transaction. A user A plays a game A via a client device. Examples of a game include a game that includes a virtual user, a game that includes wagering, a game that is played online, a game that includes building a virtual city, a game that includes building a virtual farm, a game that includes building a virtual structure, a game that includes building a virtual world, a game that includes operating a virtual weapon, a game that includes wars between virtual gangs, a game that includes gaming points that can be redeemed by a user, and a game that includes a virtual energy level of a virtual user, and a combination thereof. Examples of a virtual structure include a virtual house and a virtual building. A virtual user, a virtual farm, a virtual structure, a virtual world, a virtual weapon, a virtual energy level, a virtual city, and gaming points are examples of a virtual parameter. Examples of a client device include a cell phone, a tablet, a desktop computer, and a laptop computer.

When the user A creates one or more transactions within the game A via an input device of a client device, a game state is created by a processor of the client device and maintained in the client device. A processor, as used herein, is a central processing unit (CPU), an application specific integrated circuit (ASIC), a programmable logic device (PLD), or a microprocessor. In one embodiment, a game state of a game includes data or metadata that describes a state of one or more virtual parameters of the game. For example, a game state of a game includes a physical position of a virtual user within a virtual world of the game. As another example, a game state of a game includes a number of virtual points of the game. As yet another example, a game state of a game includes a level of virtual energy of a virtual user of the game. Examples of an input device include a keyboard, a mouse, a stylus, and a touchscreen. In some embodiments, a game state of a game includes a state of a virtual parameter of the game.

A transaction is created within a game when the user A uses an input device of a client device to change a virtual parameter of the game. For example, when the user A uses an input device of the client device A to change a physical position of a virtual user of the game A, a transaction is created by a processor of the client device A. As another example, when the user A uses an input device of the client device A to build a virtual structure of a game, an energy level of a virtual user that builds the virtual structure decreases. In this example, two transactions are created by a processor of the client device A. The first transaction includes building the virtual structure and the second transaction includes the decrease in the number of virtual energy level. As yet another example, when the user A wins virtual points while playing the game A within an input device of the client device A, a transaction is created by a processor of the client device. The transaction includes an increase in the number of virtual points.

A signature check module of a client device creates an increment signature upon an occurrence of a transaction. For example, a signature check module of the client device A determines whether a transaction has occurred in the client device A. If so, the signature check module generates one or more bits that represent that the transaction occurred at the client device A. A signature check module of a client device also compares a signature that is received from the server 102 with an appended signature that is stored in the client device to determine whether there is a match between the two signatures. In some embodiments, an appended signature is a combination of an increment signature and an LKS(c).

A client, as used herein, includes a client device, an external application running as a standalone platform, an external application running on a software as a service (SaaS) platform, or a combination thereof. As an example, a client includes a game application that is executed by one or more processors of a client device to display a game on a display device of the client device. As another example, a client includes a game application, such as a game execution logic module, of the server 102 that is executed by one or more processors of the server 102. The game application is stored in a memory device of the server 102. When the game execution logic module is executed, a game state is transferred via a game interface of the server 102 in the form of a context object via a network to the client device A. In some embodiments, the game interface includes a network interface card or a modem that allows the server 102 to communicate with a network 104, which is described below. For example, the game interface implements a Transmission Control Protocol on top of an Internet Protocol (TCP/IP) to communicate with the network 104. A graphical processing unit (GPU) of the client device A processes the game state to display, such as render, a game on a display device of the client device A. Examples of a display device include a liquid crystal display (LCD), a light emitting diode (LED) display, a cathode ray tube (CRT) display, and a plasma display.

A user plays a game at the client device A to generate a game state and an increment signature. Examples of a signature include a token, a bit, and a bit stream. The increment signature is appended to an LKS(c) to generate an appended signature that is maintained at the client device A. The appended signature is sent from the client device A to the server 102 via the network 104. Moreover, the game state is sent as a context object via the network 104 to the server 102. Examples of the network 104 include the Internet, an Intranet, and a combination of the Internet and the Intranet. Other examples of the network 104 include a wired network and a combination of the wired network and a wireless network. Yet other examples of the network 104 include a local area network (LAN), a wide area network (WAN), and a combination thereof.

The server 102 receives the game state from the client device A and maintains the game state in a memory device of the server 102. A memory device, as used herein, includes a random access memory (RAM), a read-only memory (ROM), or a combination thereof. As another example, a memory device includes a hard disk or a flash memory. Moreover, the server 102 transfers a game state stored within the server 102 via the game interface and the network 104 in the form of a context object to a client device that sends a read request to the server 102. A read request is described below.

A signature manager module of the server 102 updates an LKS(s) at the server 102 based on an appended signature that is received from a client device via the network 104. For example, the signature manager module updates the LKS(s) to match an appended signature that is received from the client device A via the network 104. An appended signature is described below.

A user quits playing on the client device A and after a while, plays the game A on a client device B. For example a user discontinues playing the game A at a game state at the client device A and continues playing the game A from the game state at the client device B. During the play at the client device B, a user uses an input device of the client device B to generate one or more transactions in the game A. The game state that was carried over from the client device A via the network 104 and the server 102 to the client device B changes when a user continues playing the game A at the client device B. The changed game state is transferred from the client device B via the network 104 and the game interface of the server 102 to a memory device of the server 102 for updating a game state, of the game A, that was received from the client device A.

Moreover, when one or more transactions occur at the client device B after receiving a game state from the client device A, an appended signature is created by a signature check module of the client device B to indicate the occurrence of the one or more transactions. The appended signature that is created by the client device B is sent via the network 104 and the game interface of the server 102 to the signature manager module of the server 102. The signature manager module of the server 102 changes the updated LKS(s) stored at the server based on the appended signature received from the client device B. For example, the signature manager module changes the updated LKS(s) to match the appended signature that is received from the client device B via the network 104.

Similarly, a user discontinues playing the game A at a game state that is maintained in the client device B and uses another client device C to continue playing the game A from the game state. There is back and forth interaction, similar to that described above, between the client device C and the server 102 via the network 104 when one or more transactions occur during the play of the game A at the client device C.

Moreover, a user discontinues playing the game A at a game state that is maintained at the client device C and uses another client device D to continue playing the game A from the game state. There is interaction between the client device D and the server 102 via the network 104 when one or more transactions occur during the play of the game A at the client device D.

It should be noted that in various embodiments, a user selects any client device randomly to play the game A. For example, a user uses the client device A to play the game A until a game state is reached. Then the user uses the client device C to continue playing the game A until a further game state is reached. The user then uses the client device A to continue playing the game A until another game state is reached.

In some embodiments, a module is a computer program that is executed by one or more processors to perform functions described in the module. For example, the signature manager module and the game execution logic module are executed by a processor of the server 102 to perform the functions described in the signature manager and game execution logic modules.

Figure 2A:
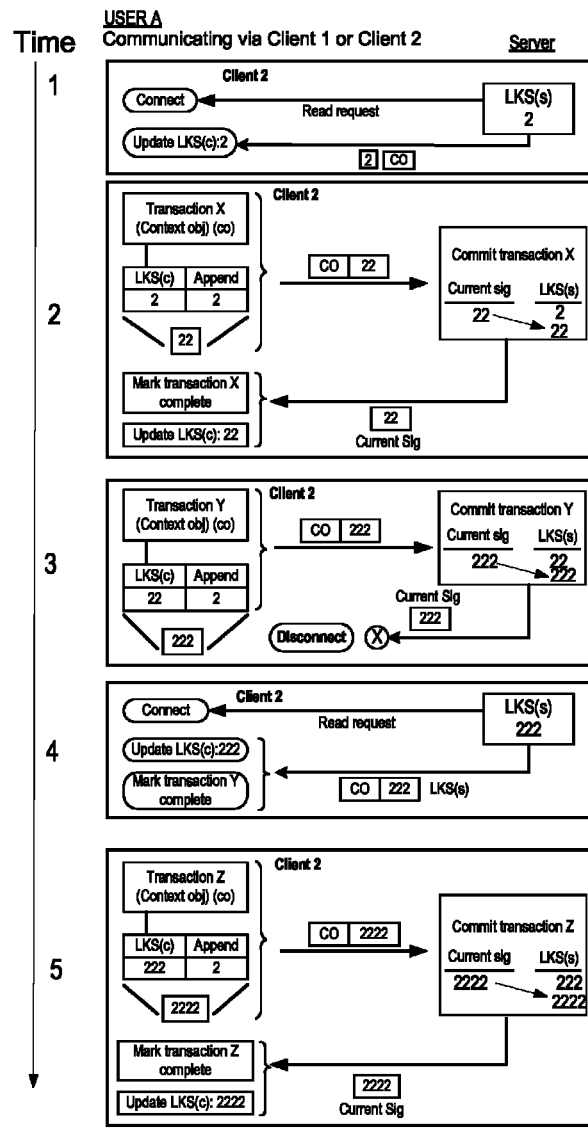
FIG. 2A is a diagram illustrating a method of communication between multiple clients and a server to facilitate marking a transaction as complete, in accordance with another embodiment of the present invention.

FIG. 2A is a diagram illustrating an embodiment of a method of communication between client 1, client 2, and the server 102 (FIG. 1) to facilitate marking a transaction as complete. In some embodiments, the client 1 is a first client device and the client 2 is a second client device. For example, the client 1 is the client device A and the client 2 is the client device B (FIG. 1). In several embodiments, the client 1 is the first game that is played on the first client device and the client 2 is a second game that is played on the first or second client device.

In one embodiment, a user A provides log in information via an input device of a client device to access a client via the server 102. As an example, the log in information includes a user name and/or a password that is assigned to the user A. When log in information is authenticated by the server 102 (FIG. 1) or another authentication server of the network 104, the user A is allowed access to a client.

In some embodiments, the user A is allowed access to a client without requiring authentication of log in information received from the user A. For example, a client after being disconnected from the server 102 tries to establish a session with the server 102 by sending a message to the server 102. If the server 102 responds to the message with another message, there is an establishment of session between the client and the server 102 and the user A is allowed access to the client.

Described below are various functions and communications performed by a client. Also described below are various functions and communications performed by the server 102. It should be noted that if the functions and communications performed by a client or server are described under a title "Time Period X", the functions and communications are performed during the time period, where X is an integer greater than zero.

Time Period 1

Upon allowance of access by the server 102 to the client 2, the client 2 sends a read request to the server 102 to read the LKS(s) from the server 102. Upon receiving the read request, the server 102 sends the LKS(s) having a value of "2" with a context object (CO) that is stored within the server 102 to the client 2.

Time Period 2

A processor associated with the client 2 determines whether a transaction has occurred at the client 2. For example, the processor associated with the client 2 determines whether a virtual user has moved from a first physical position to a second physical position. As another example, the processor associated with the client 2 determines whether a number of points have changed from a first number to a second number. It should be noted that in the embodiments in which a client is a client device, a processor is associated with a client when the processor is a part of the client device. Moreover, in the embodiments in which a client is a game, a processor is associated with a client when the processor is displaying the game.

When a transaction X occurs at the client 2, the processor associated with the client 2 appends an increment signature "2" to the LKS(c) that is stored within the client 2 to generate an appended signature "22". In some embodiments, an increment signature identifies a client and a transaction. For example, the client 1 appends an increment signature to identify that the client 1 appended the increment signature and that a transaction K occurred at the client 1. As another example, the client 2 appends an increment signature to identify that the client 2 appended the increment signature and that the transaction X occurred at the client 2. In this example, the increment signature added by the client 2 is different than the increment signature added by the client 1.

Also, when the transaction X occurs at the client 2, the processor associated with the client 2 generates a context object that includes a state of the client 2 after occurrence of the transaction X. The client 2 communicates the context object with the appended signature "22" to the server 102.

The server 102 receives the appended signature "22" and a processor of the server 102 updates the LKS(s) "2" in a memory device of the server 102 to match a value of the appended signature "22". When the LKS(s) having a value of "2" is updated to the value "22", the LKS(s) that is stored within the server 102 becomes "22".

The LKS(s) having the value of "22" is communicated from the server 102 to the client 2 via the network 114. Upon receiving the LKS(s) having the value of "22", a processor associated with the client 2 compares the LKS(s) with the appended signature. Upon determining that the value of the LKS(s) of "22" matches the value "22" of the appended signature, the client 2 updates the value '2' of LKS(c) to the value of "22" and marks the transaction X as complete.

Time Period 3

When a transaction Y occurs at the client 2, the processor associated with the client 2 appends an increment signature "2" to the LKS(c) having a value of "22" at the client 2 to generate an appended signature "222". Also, when the transaction Y occurs at the client 2, the processor associated with the client 2 generates a context object that describes a state of the client 2 after occurrence of the transactions X and Y. The client 2 communicates the context object with the appended signature "222" to the server 102.

Upon receiving the context object, the server 102 updates, in a memory device of the server 102, the context object that was communicated during the time period 2 with the context object received from the client 2 during the time period 3. For example, the updated context object includes information about the state of the client 2 after occurrence of the transactions X and Y.

The server 102 receives the appended signature "222" and a processor of the server 102 updates the LKS(s) "22" in a memory device of the server 102 to match a value of the appended signature "222". When the LKS(s) having a value of "22" is updated to the value "222", the LKS(s) that is stored in a memory device of the server 102 becomes "222".

The LKS(s) having the value of "222" is communicated from the server 102 to the client 2 via the network 114. The LKS(s) having the value of "222" is not received by the client 2.

In some embodiments, when there are hardware or software problems with the network 104, a client and the server 102 are disconnected and a signature communicated from the server 102 is not received by a client or a signature communicated from a client is not received by the server 102. For example, the LKS(s) is lost in the network 104, a network connection between the client 2 and the server 102 malfunctions or stops functioning, or a session between the client 2 and the server 102 accidentally ends. When a client and the server 102 are disconnected, access to the server 102 is lost by the client.

Time Period 4

After the lack of reception of the LKS(s) having the value of "222" by the client 2 and upon regaining access by the client 2 to the server 102, the client 2 sends a read request to the server 102 to read the LKS(s) from the server 102. Upon receiving the read request, the server 102 sends the LKS(s) "222" with a context object (CO) to the client 2. The context object sent to the client 2 is the same as the updated context object described above with reference to time period 3.

Upon receiving the LKS(s) having the value of "222" from the server 102, a processor associated with the client 2 compares the LKS(s) with the appended signature that was sent during the time period 3. Upon determining that the value of the LKS(s) of "222" matches the value "222" of the appended signature, the client 2 updates the value "22" of LKS(c) to the value of "222" and marks the transaction Y as complete.

Time Period 5

When a transaction Z occurs at the client 2, the processor associated with the client 2 appends an increment signature "2" to the LKS(c) at the client 2 to generate an appended signature "2222". Also, when the transaction Z occurs at the client 2, the processor associated with the client 2 generates a context object that describes a state of the client 2 after occurrence of the transactions X, Y, and Z. The client 2 communicates the context object with the appended signature "2222" to the server 102.

Upon receiving the context object, the server 102 updates, in a memory device of the server 102, the context object that was communicated during the time period 3 with the context object received from the client 2 during the time period 5. For example, the updated context object includes information about the state of the client 2 after occurrence of the transactions X, Y, and Z.

The server 102 receives the appended signature "2222" and a processor of the server 102 updates the LKS(s) "222" in a memory device of the server 102 to match a value of the appended signature "2222". When the LKS(s) having a value of "222" is updated to the value "2222", the LKS(s) becomes "2222" within a memory device of the server 102.

The LKS(s) having the value of "2222" is communicated from the server 102 to the client 2 via the network 114. Upon receiving the LKS(s) having the value of "2222", a processor associated with the client 2 compares the LKS(s) with the appended signature. Upon determining that the value of the LKS(s) of "2222" matches the value "2222" of the appended signature, the client 2 updates the value "222" of LKS(c) to the value of "2222" and marks the transaction Z as complete.

Figure 2B:
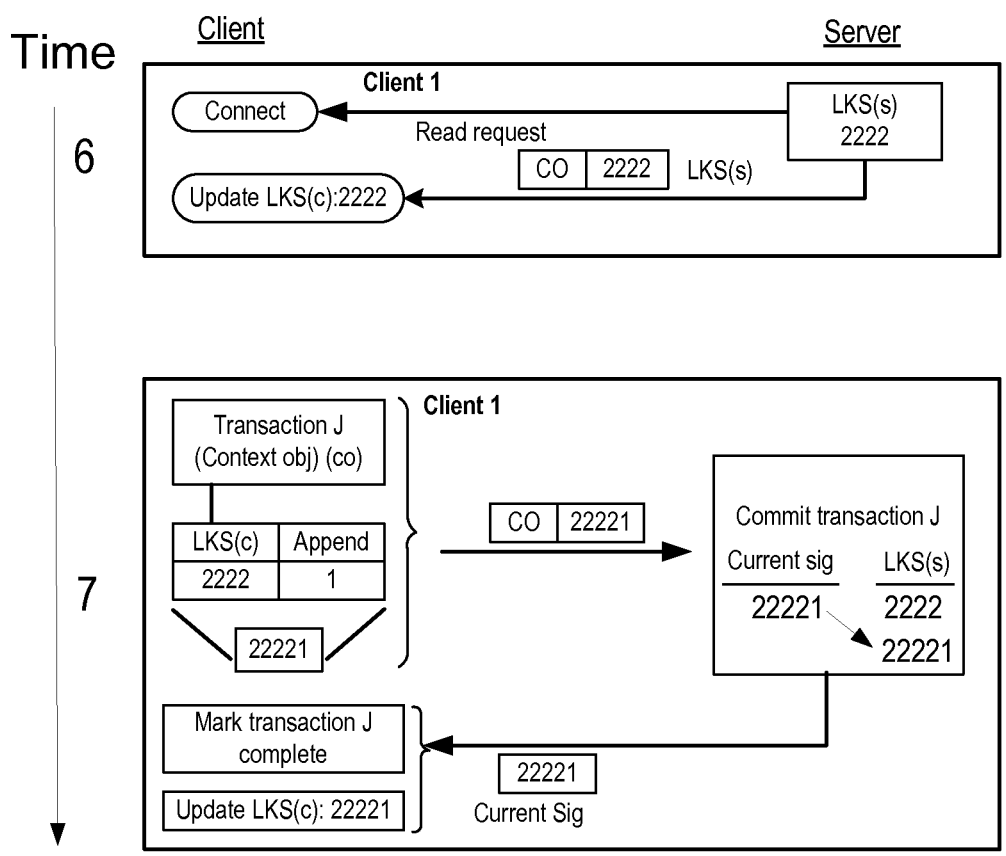
FIG. 2B is a continuation of the FIG. 2A, in accordance with another embodiment of the present invention.

FIG. 2B is a continuation of the FIG. 2A to describe an embodiment of a method of communication between client 1, client 2, and the server 102 (FIG. 1) to facilitate marking a transaction as complete.

Time Period 6

Upon allowance of access by the server 102 to client 1, the client 1 sends a read request to the server 102 to read the LKS(s) from the server 102. Upon receiving the read request, the server 102 sends the LKS(s) "2222" with the context object (CO) to the client 1. The context object is the same as that communicated during the time period 5 from the client 2 to the server 102. Upon receipt of the signature "2222", the signature "2222" is stored in a memory device of the client 1 by a processor of the client 1 as LKS(c). For example, upon receipt of the signature "2222", any value of LKS(c) that is stored in a memory device of the client 1 is updated by a processor associated with the client 1 to the value "2222".

Time Period 7

When a transaction J occurs at the client 1, the processor associated with the client 1 appends an increment signature "2" to the LKS(c) at the client 1 to generate an appended signature "22221". Also, when the transaction J occurs at the client 1, the processor associated with the client 1 generates a context object that includes a state of the client 1 after occurrence of the transactions X, Y, Z, and J. The client 1 communicates the context object with the appended signature "22221" to the server 102.

Upon receiving the context object, the server 102 updates, in a memory device of the server 102, the context object that was communicated during the time period 5 with the context object received from the client 1 during the time period 6. For example, the updated context object includes information about the state of the client 2 after occurrence of the transactions X, Y, and Z and about the state of the client 1 after occurrence of the transaction J.

The server 102 receives the appended signature "22221" and a processor of the server 102 updates the LKS(s) "2222" that is stored within a memory device of the server 102 to match a value of the appended signature "22221". When the LKS(s) having a value of "2222" is updated to the value "22221" within a memory device of the server, the LKS(s) becomes "22221".

The LKS(s) having the value of "22221" is communicated from the server 102 to the client 1 via the network 114. Upon receiving the LKS(s) having the value of "22221", a processor associated with the client 1 compares the LKS(s) with the appended signature. Upon determining that the value of the LKS(s) of "22221" matches the value "22221" of the appended signature, the client 1 updates the value "2222" of LKS(c) to the value of "22221" and marks the transaction J as complete.

It should be noted that the time periods 1 thru 7 described above in FIGS. 2A and 2B are consecutive time periods. For example, the time period 2 follows the time period 1 and the time period 3 follows the time period 2.

It should further be noted that a context object and a signature are communicated between a network interface card or a modem of a client device and the game interface of the server 102 via the network 114. For example, a context object and/or a signature are sent from a server by the game interface of the server. As another example, a context object and/or a signature are sent from a client device by a network interface card or modem of the client device. Moreover, the communication of the read request, the context object, and the LKS(s) are performed during the time period 1, as shown in FIG. 2A. Upon receipt of the signature "2", the signature "2" is stored in a memory device of the client 2 by a processor of the client 2 as LKS(c).

Figure 3A:
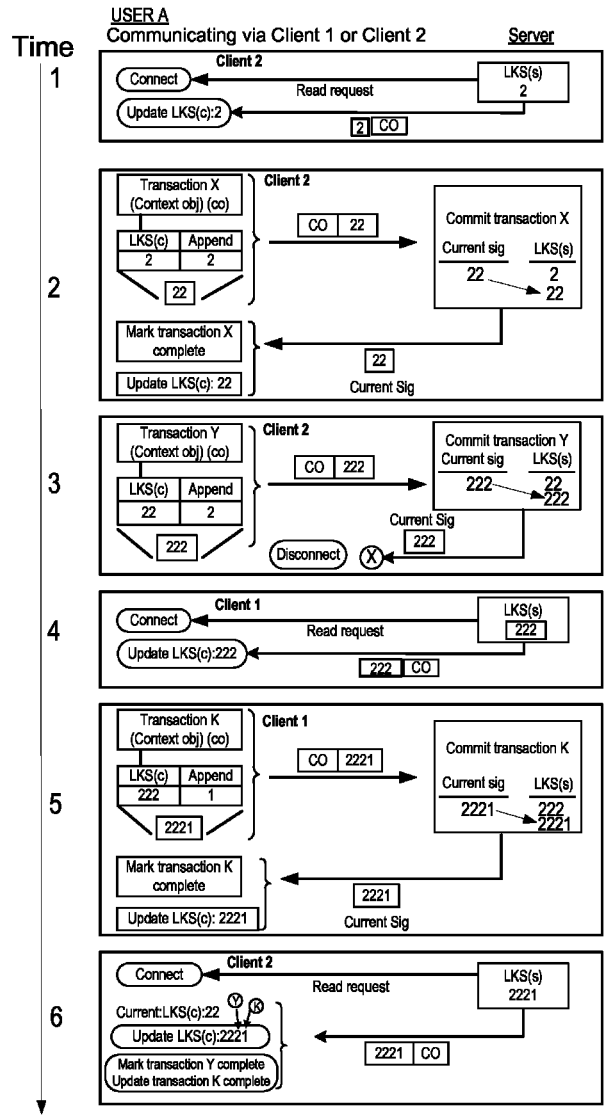
FIG. 3A is a diagram illustrating a method of communication between multiple clients and the server to facilitate marking a transaction as complete, in accordance with one embodiment of the present invention.

FIG. 3A is a diagram illustrating an embodiment of a method of communication between client 1, client 2, and the server 102 (FIG. 1) to facilitate marking a transaction as complete. Functions and communication between the server 102 and the client 2 that occur during time periods 1, 2, and 3 that are illustrated in FIG. 3A are the same as that occurring during the time periods 1, 2, and 3 that are illustrated in FIG. 2A.

Time Period 4

Upon allowance of access, the client 1 sends a read request to the server 102 to read the LKS(s) from the server 102. Upon receiving the read request, the server 102 sends the LKS(s) "222" with the context object (CO) to the client 1. The context object is the same as that communicated during the time period 3 from the client 2 to the server 102. Upon receipt of the signature "222", the signature "222" is stored in a memory device of the client 1 by a processor of the client 2 as LKS(c). For example, upon receipt of the signature "222", any value of LKS(c) that is stored in a memory device of the client 1 is updated by a processor associated with the client 1 to the value "222".

Time Period 5

When the transaction K occurs at the client 1, the processor associated with the client 1 appends an increment signature "1" to the LKS(c) at the client 1 to generate an appended signature "2221". Also, when the transaction K occurs at the client 1, the processor associated with the client 1 generates a context object that includes a state of the client 1 after occurrence of the transactions X, Y, and K. The client 1 communicates the context object with the appended signature "2221" to the server 102.

Upon receiving the context object, the server 102 updates, in a memory device of the server 102, the context object that was communicated during the time period 3 with the context object received from the client 1 during the time period 5. For example, the updated context object includes information about the state of the client 2 after occurrence of the transactions X and Y and about the state of the client 1 after occurrence of the transaction K.

The server 102 receives the appended signature "2221" and a processor of the server 102 updates the LKS(s) "222" to match a value of the appended signature "2221". When the LKS(s) having a value of "222" is updated to the value "2221", the LKS(s) becomes "2221".

The LKS(s) having the value of "2221" is communicated from the server 102 to the client 1 via the network 114. Upon receiving the LKS(s) having the value of "2221", a processor associated with the client 1 compares the LKS(s) with the appended signature. Upon determining that the value of the LKS(s) of "2221" matches the value "2221" of the appended signature, the client 1 updates the value of "222" of LKS(c) to the value of "2221" and marks the transaction K as complete.

Time Period 6

After the lack of reception of the LKS(s) having the value of "222" by the client 2 during the time period 3 and upon regaining access to the server 102, the client 2 sends a read request to the server 102 to read the LKS(s) from the server 102. Upon receiving the read request, the server 102 sends the LKS(s) "2221" with a context object (CO) to the client 2. The context object sent to the client 2 is the same as the updated context object described above with reference to time period 5 and that includes state of the client 2 after occurrence of the transactions X and Y and state of the client 1 after occurrence of the transaction K.

Upon receiving the LKS(s) having the value of "2221", a processor associated with the client 2 compares the LKS(s) with the appended signature that was sent during the time period 3. Upon determining that the LKS(s) of "2221" lacks a match with the value "222" of the appended signature, a processor of the client 2 changes the value "22" of LKS(s) to match the value "2221" of LKS(s) and marks the transactions Y and K as complete. The portion '1' of the value "2221" of LKS(c) identifies the client 1 and the transaction K.

In some embodiments, the server 102 sends a client identifier of a client to the remaining clients via the network 104 before receiving a read request from the remaining clients. For example, the server 102 sends an identifier of the client 1 to the client 2 before receiving a read request from the client 2 and sends an identifier of the client 2 to the client 1 before receiving a read request from the client 1. In these embodiments, the remaining clients recognize a client at which a transaction occurred based on an identifier that is received from the server 102. In these embodiments, when an inclusion of an identification of a client at which a transaction is performed in a communication between the remaining clients and the server 102, the remaining clients are informed that the transaction was performed at the client.

Figure 3B:
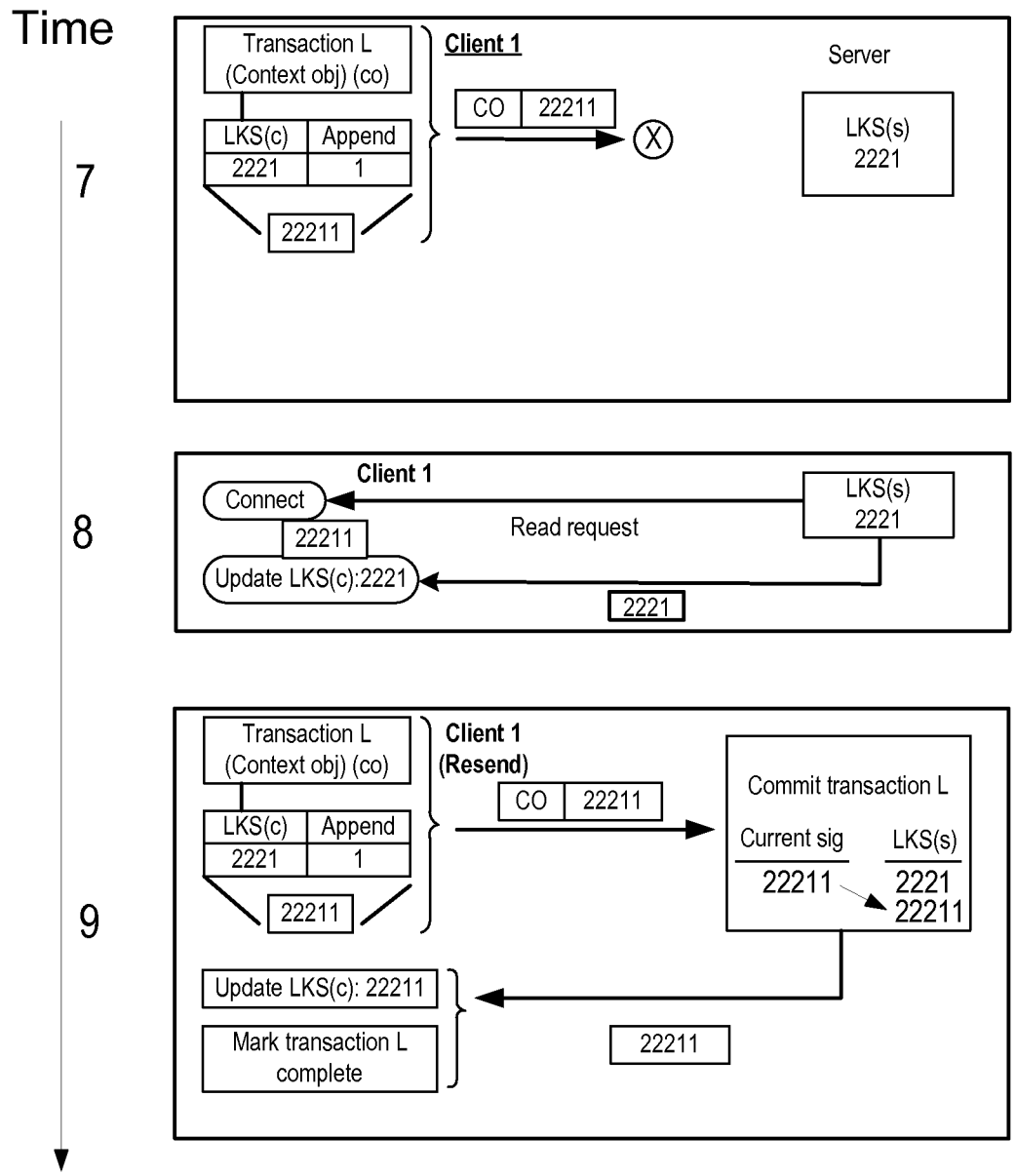
FIG. 3B is a continuation of the FIG. 3A, in accordance with one embodiment of the present invention.

FIG. 3B is a continuation of the FIG. 3A to describe an embodiment of a method of communication between client 1, client 2, and the server 102 (FIG. 1) to facilitate marking a transaction as complete.

Time Period 7

When a transaction L occurs at the client 1, the processor associated with the client 1 appends an increment signature "1" to the LKS(c) having a value of "2221" at the client 1 to generate an appended signature "22211". Also, when the transaction L occurs at the client 1, the processor associated with the client 1 generates a context object that describes a state of the client 1 after occurrence of the transactions X, Y, K, and L. The client 2 communicates the context object with the appended signature "22211" to the server 102. The appended signature having the value of "22211" and the context object are not received by the server 102 due to a loss of access to the server 102 by the client 1.

Time Period 8

After the lack of reception of the appended signature having the value of "22211" and the context object by the server 102 and upon regaining access to the server 102, the client 1 sends a read request to the server 102 to read the LKS(s) from the server 102. Upon receiving the read request, the server 102 sends the LKS(s) "2221" with a context object (CO) to the client 1. The context object sent to the client 1 is the same as the context object that is described above with reference to time period 5 of FIG. 3A.

Upon receiving the LKS(s) having the value of "2221", a processor associated with the client 1 compares the LKS(s) with the value "22211" of the appended signature that was sent during the time period 7 of FIG. 3B. Upon determining that the value of the LKS(s) of "2221" lacks a match with the value "22211" of the appended signature, a processor of the client 1 decides to resend the appended signature having the value "22211" to the server 102.

Time Period 9

A processor associated with the client 1 resends the context object and the appended signature having the value "22211" to the server 102. The context object is the same as that sent during the time period 7 of FIG. 2B.

Upon receiving the context object, the server 102 updates, in a memory device of the server 102, the context object that was communicated during the time period 5 of FIG. 3A with the context object received from the client 1 during the time period 9. For example, the updated context object includes information about the state of the client 2 after occurrence of the transactions X and Y and about the state of the client 1 after occurrence of the transactions K and L.

The server 102 receives the appended signature "22211" and a processor of the server 102 updates the LKS(s) "2221" to match a value of the appended signature "22211". When the LKS(s) having a value of "2221" is updated to the value "22211", the LKS(s) becomes "22211".

The LKS(s) having the value of "22211" is communicated from the server 102 to the client 1 via the network 114. Upon receiving the LKS(s) having the value of "22211", a processor associated with the client 1 compares the LKS(s) with the value "22211" of the appended signature. Upon determining that the value of the LKS(s) of "22211" matches the value "22211" of the appended signature, the client 1 updates the value "2221" of LKS(c) to the value of "22211" and marks the transaction L as complete.

It should be noted that the time periods 1 thru 9 described above in FIGS. 3A and 3B are consecutive time periods. For example, the time period 9 follows the time period 8 and the time period 8 follows the time period 7.

It should further be noted that in some embodiments, the server 102 determines based on an identification of a client within an appended signature received from the client whether the client is registered with the server 102. If the client is not registered, the server 102 determines that the client is fraudulent and sends a notification to the remaining clients that the client is fraudulent.

It should be noted that the integers "1", "2", and so on, that are used as increment signatures are examples of increment signatures. For example, any other identifier that identifies a client or a combination of a client and transaction is used as an increment signature. As another example, an increment signature includes a bit, a bit stream or a token.

Figure 4:
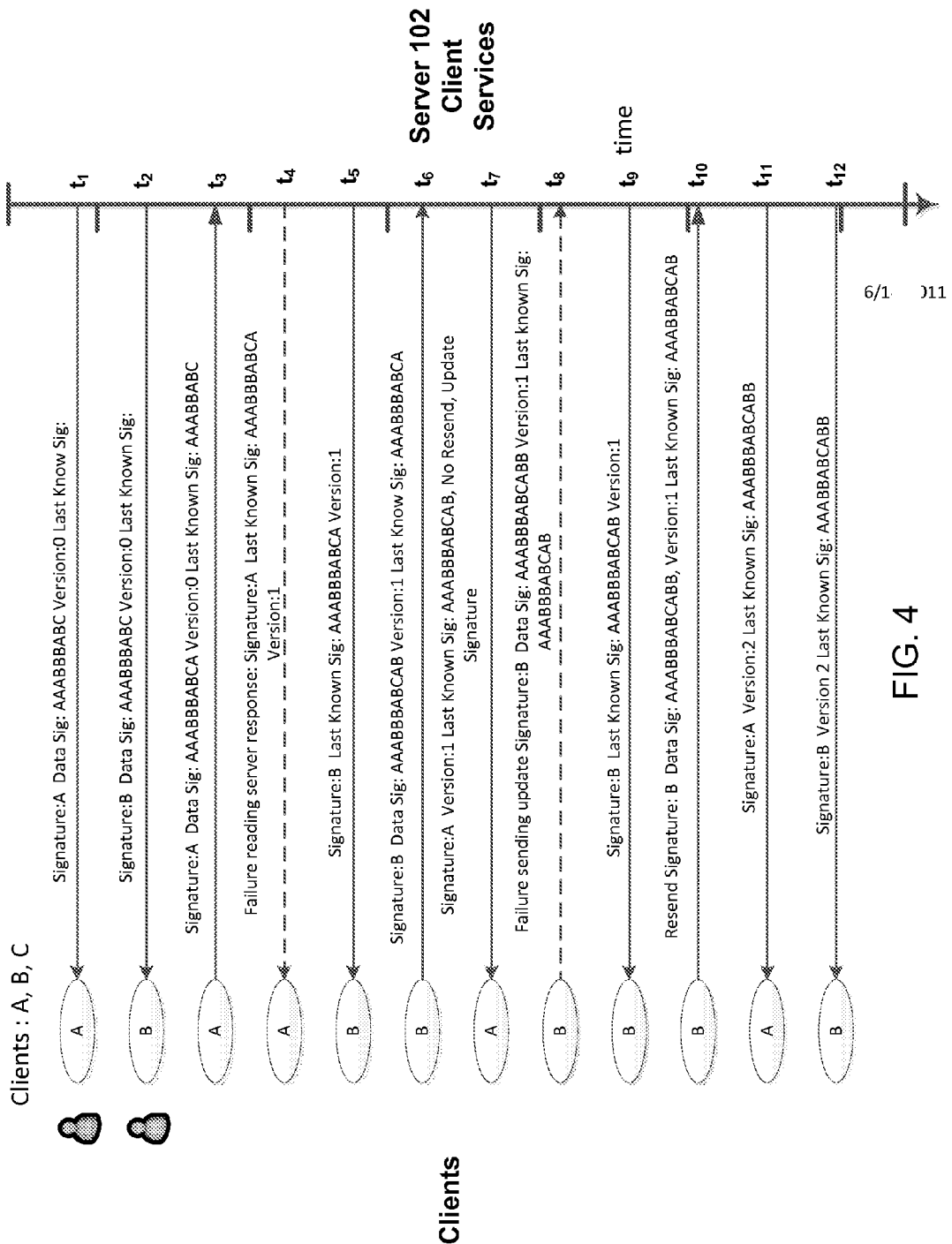
FIG. 4 is a diagram illustrating a method of communication between multiple clients and the server to facilitate marking a transaction as complete, in accordance with one embodiment of the present invention.

FIG. 4 is a diagram illustrating an embodiment of a method of communication between client A, a client B, and the server 102 (FIG. 1) to facilitate marking a transaction as complete. It should be noted that client A is the same as client 1, client B is the same as client 2, and client C is the same as client 3 (FIG. 1). The client A and a transaction occurring at the client A is identified by an increment signature "A", the client B and a transaction occurring at the client B is identified by an increment signature "B", and the client C and a transaction occurring at the client C is identified by an increment signature "C".

Time Period $t_1$

During the time period $t_1$, upon allowance of access to client A by the server 102, a data signature "AAABBBABC" and a version 0 are received by the client A from the server 102. The data signature "AAABBBABC" is a last known signature at the server 102. The version 0 is a version of a context object that is stored in a memory device of the server 102.

Time Period $t_2$

Moreover, during the time period $t_2$, upon allowance of access to client B by the server 102, the data signature "AAABBBABC" and the version 0 are received by the client B from the server 102.

Time Period $t_3$

Moreover, during the time period $t_3$, a transaction occurs at the client A. When the transaction occurs, the data signature "AAABBBABC" received by the client A during the time period $t_1$ is modified to a data signature "AAABBBABCA" by a processor associated with the client A and sent to the server 102. The server 102 receives the data signature "AAABBBABCA" to update the last known signature from "AAABBBABC" to "AAABBBABCA".

Moreover, when the transaction occurs, the version 0 that is stored at the client A is sent to the server 102. The server 102 receives the version 0 to update the version 0 to a version 1, which is a version that indicates that the transaction occurred at the client A during the time period $t_3$.

Time Period $t_4$

During the time period $t_4$, the server 102 gets disconnected from the client A and the client A does not receive the updated last known signature of "AAABBBABCA" and the version 1 from the server 102.

Time Period $t_5$

During the time period $t_5$, upon allowance of access to client B by the server 102, the last known signature "AAABBBABCA" and the version 1 are received by the client B from the server 102.

Time Period $t_6$

Moreover, during the time period $t_6$, a first transaction occurs at the client B. When the first transaction occurs at the client B, the data signature "AAABBBABCA" received by the client B during the time period $t_5$ is modified to a data signature "AAABBBABCAB" by a processor associated with the client B and sent to the server 102. The server 102 receives the data signature "AAABBBABCAB" to update the last known signature from "AAABBBABCA" to "AAABBBABCAB".

Furthermore, when the first transaction occurs at the client B, the version 1 of the context object that is stored at the client B is sent to the server 102. The server 102 receives the version 1 but does not update the version 1 to a version 2. It should be noted that a version number indicates a highest number of transactions occurring at a client among multiple clients that are coupled with the server 102 rather than a cumulative number of transactions at the multiple clients. For example, if two transactions occur at the client B and one transaction occurs at the client A, the version number at the server 102 is two. As another example, if three transactions occur at the client A and one transaction occurs at the client B, the version number at the server 102 is three.

Time Period $t_7$.

During the time period $t_7$, upon allowance of access to client A by the server 102 after the loss of connection with the server 102, the last known signature "AAABBBABCAB" and the version 1 are received by the client A from the server 102. It should be noted that the version 1 is the same as that after reception, during the time period $t_3$, of the data signature "AAABBBABCA" from the client A. There is no change in the version number after the reception, during the time period $t_3$, of the data signature "AAABBBABCA" from the client A although client B sent the data signature "AAABBBAB-CAB", which indicated an occurrence of a transaction at the client B during the time period $t_6$.

Time Period $t_8$

During the time period $t_8$, a second transaction occurs at the client B. When the second transaction occurs, the last known signature at the server 102 of "AAABBBABCAB" is modified to a data signature "AAABBBABCABB" by a processor associated with the client B and sent to the server 102. Moreover, the version 1 that is received by the client B during the time period $t_5$ is sent to the server 102.

When the data signature "AAABBBABCABB" and the version 1 are in transit between the client B and the server 102, the client B looses access to the server 102 and the data signature and the version 1 are not received by the server 102. The server 102 does not update the last known signature from "AAABBBABCAB" to ""AAABBBABCABB" and does not update the version 1 to a version 2. The update of the version 1 to version 2 indicates that the second transaction has occurred at the client B.

Time Period $t_9$

During the time period $t_9$, the client B is allowed access to the server 102 and the last known signature of "AAABBBAB CAB" and the version 1 are received from the server 102.

Time Period $t_{10}$

During the time period $t_{10}$, the client B resends the signature "AAABBBABCABB" and the version 1 to the server 102.

Upon reception of the signature "AAABBBABCABB", the server 102 updates the last known signature from "AAABBBABCAB" to "AAABBBABCABB" and the version 1 to a version 2 to indicate that a second transaction occurred at one of the clients A, B, and C, which is the second transaction at the client B.

Time Period $t_{11}$

During the time period $t_{11}$, the client A is allowed access to the server 102 and the last known signature of "AAABBBA-BCABB" and the version 2 are received from the server 102 by the client A.

Time Period $t_{12}$

During the time period $t_{11}$, the client B is allowed access to the server 102 and the last known signature of "AAABBBA-BCABB" and the version 2 are received from the server 102 by the client B.

It should be noted that the time periods $t_1$ thru $t_{12}$ described above in FIG. 4 are consecutive time periods. For example, the time period $t_{12}$ follows the time period $t_{11}$ and the time period $t_{11}$ follows the time period $t_{10}$.

It should further be noted that various functions described herein as being performed by a client device are performed by one or more processors of the client device. Similarly, in some embodiments, various functions described herein as being performed by the server 102 are performed by one or more processors of the server 102.

It should also be noted that the letters "A", "B", "C" and so on, that are used as increment signatures are examples of increment signatures. For example, any other identifier that identifies a client or a combination of a client and transaction is used as an increment signature. As another example, an increment signature includes a bit, a bit stream or a token.

The various embodiments described above are described with reference to the server 102. In other embodiments, multiple servers instead of the server 102 perform the same functions and communications with clients as that performed by the server 102. Moreover, the various embodiments described above involve appending an increment signature to generate an appended signature. In some embodiments, an increment signature is prepended to a last known signature LKS(c) to generate a prepended signature.

Figure 5:
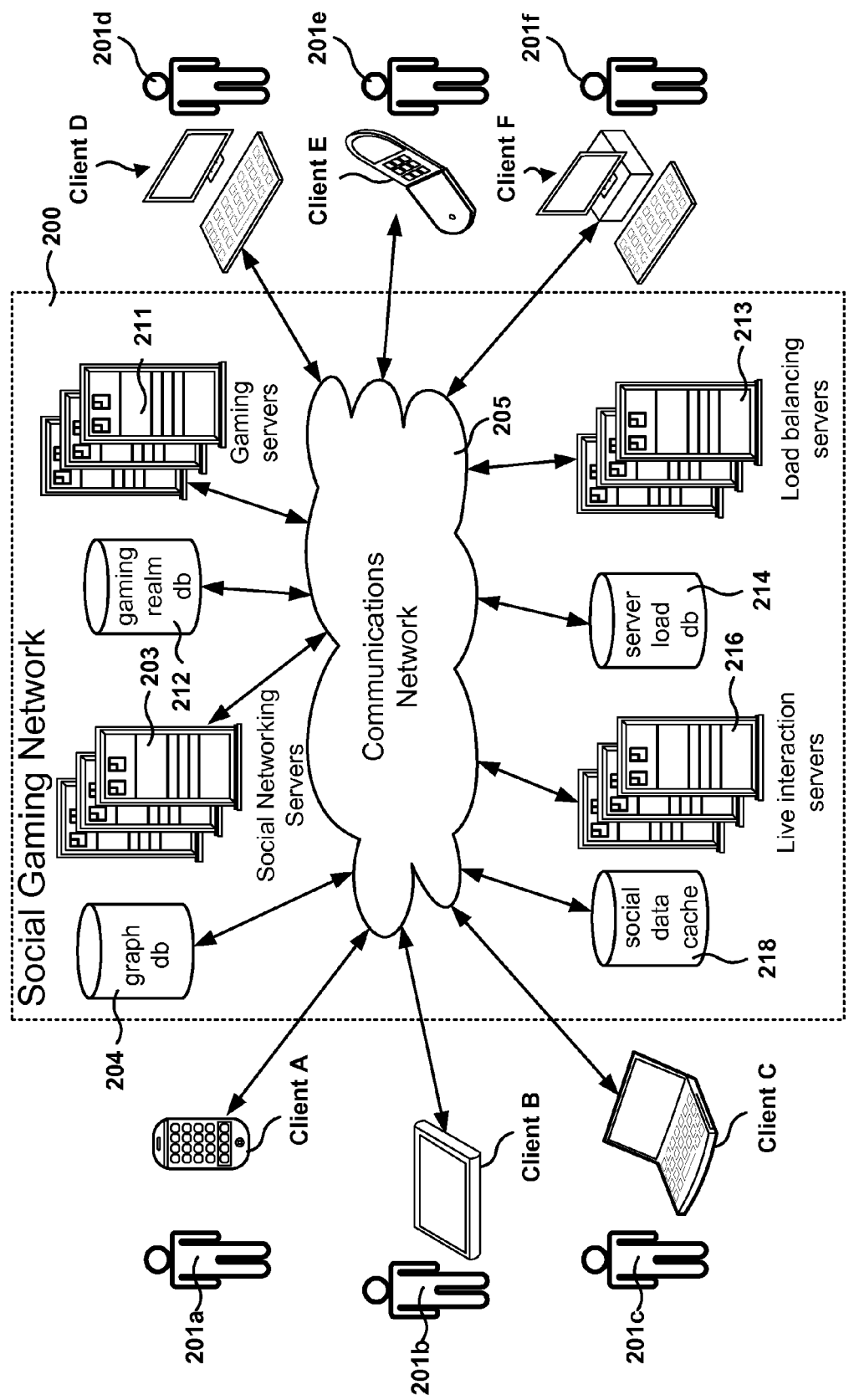
FIG. 5 is a block diagram illustrating a social gaming network architecture, in accordance with one embodiment of the present invention.

FIG. 5 is a block diagram illustrating a social gaming network architecture, according to one embodiment. In some implementations, a plurality of players (e.g., 201a-201f) may be utilizing a social gaming network 200. The players are examples of users, which are described above. Each player interacts with the social gaming network 200 via one or more client devices (e.g., client devices A thru F). The client devices may communicate with each other and with other entities affiliated with the gaming platform via a communications network 205, which is an example of the network 104 (FIG. 1). Further, the players 201 may be utilizing a social networking service provided by a social networking server (e.g., social networking servers 203) to interact with each other.

When a player provides an input into the player's client device, the client device may in response send a message via the communications network to the social networking server. The social networking server may update the player profile, save the message to a database, send messages to other players, etc. The social gaming network 200 may include a social graph database 204, which stores player relationships, social player profiles, player messages, and player social data.

The gaming servers 211 host one or more game applications, and perform the computations necessary to provide gaming features to the players 201 and client devices A thru F. One or more gaming realm databases 212 store data related to the gaming services, such as the game applications and modules, virtual gaming environment ("realm") data, player gaming session data, player scores, player virtual gaming profiles, game stage levels, etc. The gaming servers 203 may utilize the data from the gaming realm databases to perform the computations related to providing gaming services for the players 201. In some implementations, a server load database 214 stores gaming server load statistics, such as computational load, server responses times, etc.

The social gaming network 200 may include one or more load balancing servers 213 and one or more live interaction servers 216. The live interaction servers 216 monitor which players are online, and determine if a player's neighbors are currently online This allows live interactions between players 201, as described below in more detail with reference to FIG. 6. In one embodiment, a social data cache 418 stores some of the graph data related to player game links (e.g., neighbors) for fast access to the social data.

Figure 6:
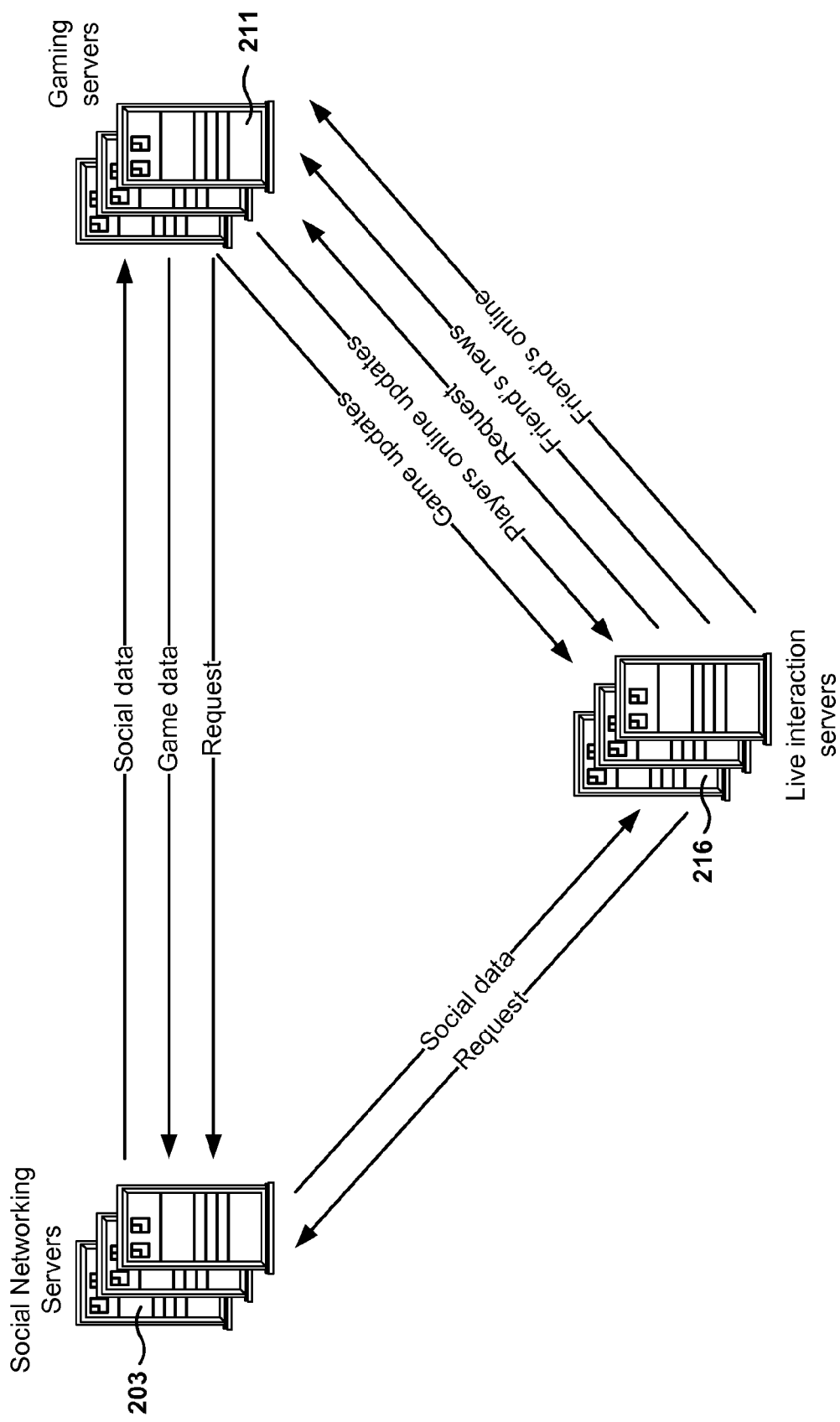
FIG. 6 illustrates the interactions between multiple servers of FIG. 5, in accordance with one embodiment of the present invention.

FIG. 6 illustrates the interactions between the servers of FIG. 5, in accordance with one embodiment of the invention. As described above, social networking servers 203 collect social data regarding the players. This social data is made available to gaming servers 211 and live interaction servers 216. The social data might be sent periodically, without a request for data, or may be sent as the result of a request sent from the gaming servers 211 or the live interaction servers 216.

The gaming servers 211 are used to execute the online games and hold the gaming data, which can be shared with social networking servers 203 and live interaction servers 216. The game data (e.g., game updates) may be sent periodically, without responding to a request, or might be sent in response to a request, or might be sent in combination ("piggy-backed") with other information exchanged between the servers (e.g., game progress or activities data). In one embodiment, live interaction servers 216 periodically poll gaming servers 211 requesting the list of players 201 that are online playing the game, or the list of neighbors of a particular player that are currently online. In one embodiment, polling is performed every 15 seconds, and in another embodiment, the polling interval is in the range between 5 seconds and 5 minutes, although other values are also possible.

In one embodiment, communications between the players 201 are managed by the live interaction servers 216. A first player knows that a second player is online because the live interaction servers 216 have notified the first player that the second player is online playing the game (of course the first player and the second player are friends in the online game). When the first player sends a message to the second player, the game of the first player sends the message to the live interaction servers 216, which forward the message to the game of the second player. Similarly, when the second player wants to send a message to the first player, the message is sent through live interaction servers 216.

In another embodiment, the game update information sent by the gaming servers 211 includes information regarding the players 201 playing a particular game, as well as information regarding users that are playing other online games. This way, a player may receive information about the neighbors that are playing the same online game, or about the neighbors that are playing other online games. The game updates sent from the gaming servers 211 include information regarding the status of the neighbor's game. The status may include score, current activities, requests for help, recent progress made in the game, sign-on and sign-off information, etc.

Live interaction servers 216 keep track of which neighbors are online at a given time. Live interaction servers 216 analyze the game updates received from gaming servers 211 and create social game data to inform users of neighbor's activities. These activities may include information on which neighbors are online, neighbor's recent activities (e.g., game progress), news, etc.

It should be noted that any of the social networking servers 203, the gaming servers 211, the live interaction servers 216, and the load balancing servers 213 are examples of the server 102 (FIG. 1). It is noted that the embodiments illustrated in FIG. 6 are exemplary. Other embodiments may utilize different server configurations, divide the tasks differently among the servers, or exchange information between servers in different forms. The embodiments illustrated in FIG. 6 should therefore not be interpreted to be exclusive or limiting, but rather exemplary or illustrative.

Figure 7:
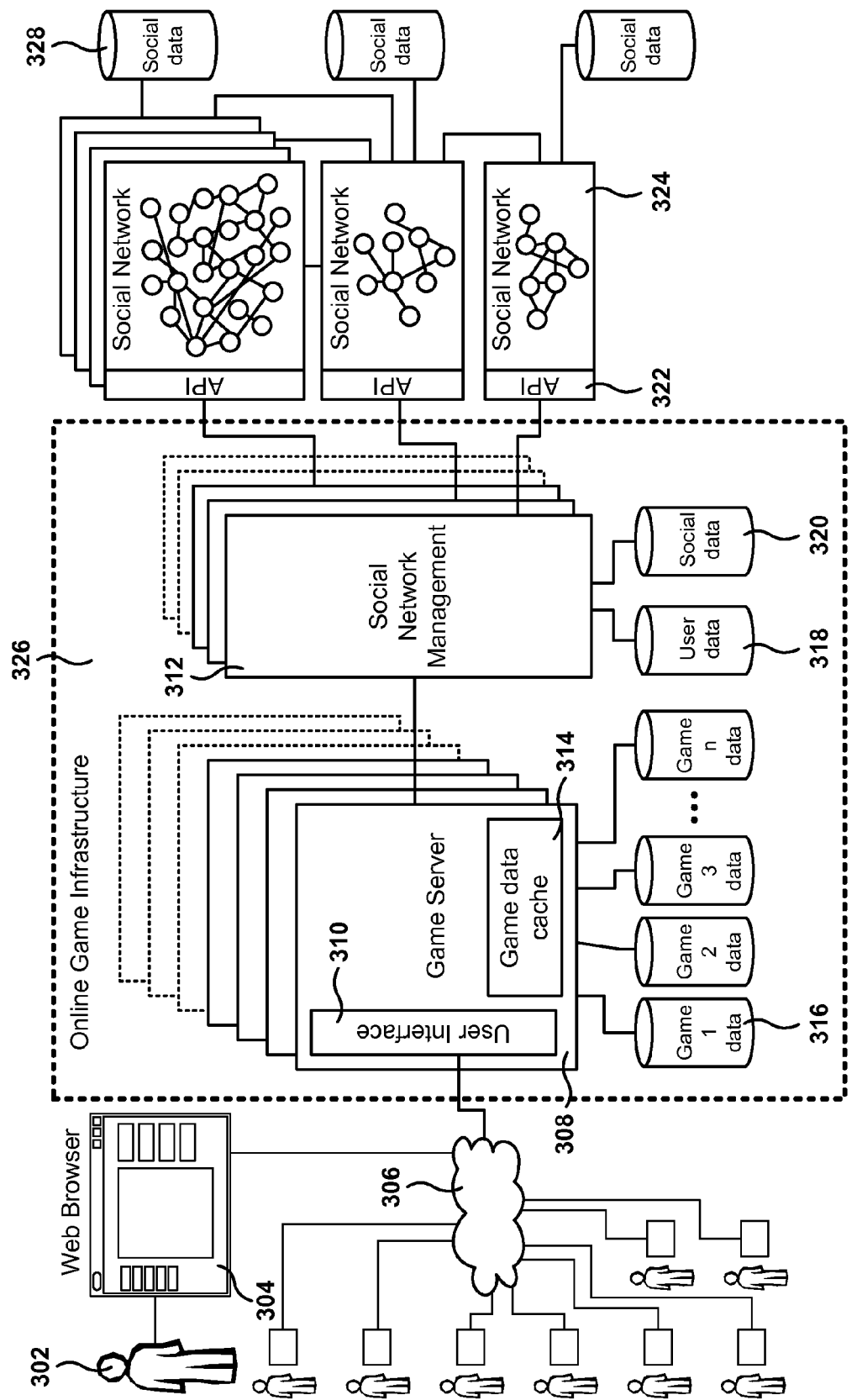
FIG. 7 illustrates an implementation of an online game infrastructure, in accordance with one embodiment of the present invention.

FIG. 7 illustrates an implementation of an online game infrastructure 526, according to one embodiment. The online game infrastructure 326 includes one or more game servers 308, web servers (not shown), one or more social network management servers 312, and databases to store game related information. It should be noted that any of the game servers 308, web servers, and the social network management servers 312 are examples of the server 102 (FIG. 1). In one embodiment, game server 308 provides a user interface 310 for players 302 to play the online game. The players 302 are examples of the users, which are described above. In one embodiment, game server 308 includes a Web server for players 302 to access the game via web browser 304, but the Web server may also be hosted in a server different from game server 308. Network 306, which is an example of the network 104 (FIG. 1), interconnects players 302 with the one or more game servers 308.

Each game server 308 has access to one or more game databases 316 for storing game data. In addition, a single database can store game data for one or more online games. Each game server 308 may also include one or more levels of caching. Game data cache 314 is a game data cache for the game data stored in game databases 316. For increased performance, caching may be performed in several levels of caching. For instance, data more frequently used is stored in a high priority cache, while data requiring less access during a session will be cached and updated less frequently.

The number of game servers 308 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 312 provide support for the social features incorporated into the online games. The social network management servers 312 access social data 328 from one or more social networks 324 via Application Programming Interfaces (API) 322 made available by the social network providers. Each social network 324 includes social data 328, and this social data 328, or a fraction of the social data, is made available via API 322. As in the case of the game servers, the number of social network management servers 312 that are active at a point in time changes according to the load on the infrastructure. As the demand for social data increases, the number of social network management servers 312 increases. Social network management servers 312 cache user data in database 318, and social data in database 320. The social data might include the social networks where a player is present, the social relationships for the player, the frequency of interaction of the player with the social network and with other players, etc. Additionally, the user data kept in database 318 may include the player's name, demographics, e-mail, games played, frequency of access to the game infrastructure, etc.

It is noted that the embodiment illustrated in FIG. 7 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 7 should therefore not be interpreted to be exclusive or limiting, but rather exemplary or illustrative.

Figure 8:
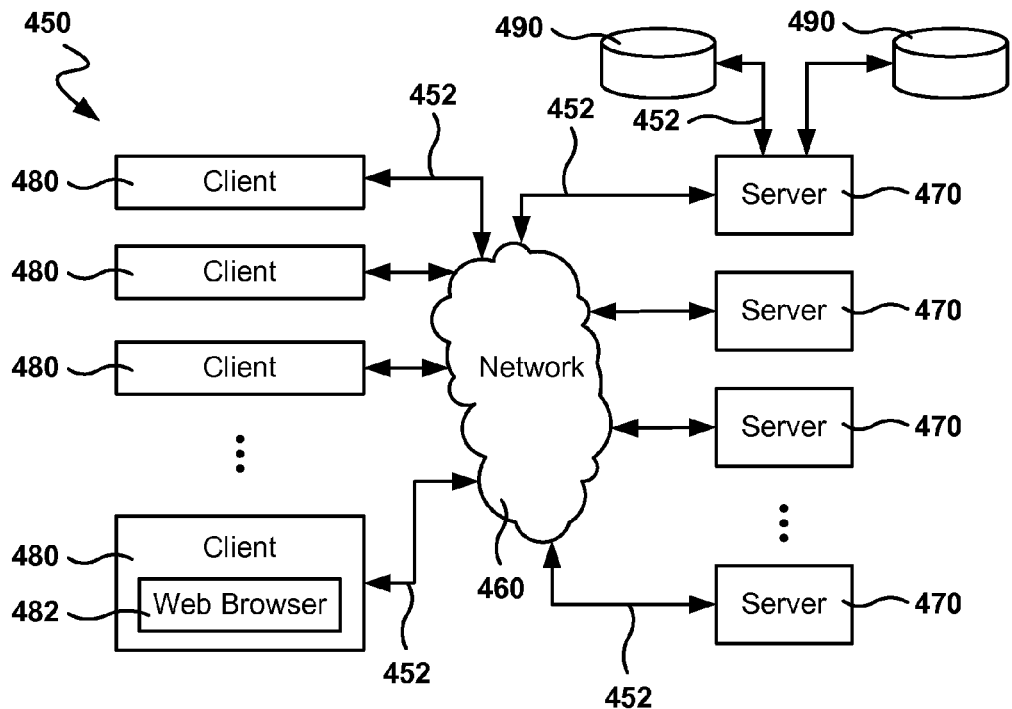
FIG. 8 illustrates a network environment suitable for implementing embodiments of the invention.

FIG. 8 illustrates an example network environment 450 suitable for implementing embodiments of the invention. Network environment 450 includes a network 460 coupling one or more servers 470 and one or more clients 480 to each other. The network 560 is an example of the network 104 (FIG. 1) and the server 470 is an example of the server 102 (FIG. 1). In particular embodiments, network 460 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks.

One or more links 452 couple a server 470 or a client 480 to network 460. In particular embodiments, one or more links 452 each includes one or more wireline, wireless, or optical links 452. In particular embodiments, one or more links 452 each includes an intranet, an extranet, a VPN, a LAN, a WLAN, a WAN, a MAN, a portion of the Internet, or another link 452 or a combination of two or more such links 452.

Each server 470 may be a stand-alone server or may be a distributed server spanning multiple computers or multiple datacenters. Servers 470 may be of various types, such as, for example and without limitation, web server, news server, mail server, message server, advertising server, file server, application server, exchange server, database server, or proxy server. Each server 470 may include hardware, software, embedded logic components, or a combination of two or more such components for carrying out the appropriate functionalities implemented or supported by server 470. For example, a web server is generally capable of hosting websites containing web pages or particular elements of web pages. More specifically, a web server may host hypertext markup language (HTML) files or other file types, or may dynamically create or constitute files upon a request, and communicate them to clients 480 in response to HTTP or other requests from clients 480. A mail server is generally capable of providing electronic mail services to various clients 480. A database server is generally capable of providing an interface for managing data stored in one or more data stores.

In particular embodiments, one or more data storages 490 may be communicatively linked to one or more severs 470 via one or more links 452. Data storages 490 may be used to store various types of information. The information stored in data storages 490 may be organized according to specific data structures. In particular embodiments, each data storage 490 may be a relational database. Particular embodiments may provide interfaces that enable servers 470 or clients 480 to manage, e.g., retrieve, modify, add, or delete, the information stored in data storage 490.

In particular embodiments, each client 480 may be an electronic device including hardware, software, or embedded logic components or a combination of two or more such components and capable of carrying out the appropriate functionalities implemented or supported by client 480. For example and without limitation, a client 480 may be a desktop computer system, a notebook computer system, a netbook computer system, a handheld electronic device, or a mobile telephone. A client 480 may enable a network player at client 480 to access network 460. A client 480 may enable a player to communicate with other players at other clients 480. Further, each client 480 may be a computing device, such as a desktop computer or a work station, or a mobile device, such as a notebook computer, a network computer, or a smart telephone.

In particular embodiments, a client 480 may have a web browser 482 and may have one or more add-ons, plug-ins, or other extensions. A player at client 480 may enter a Uniform Resource Locator (URL) or other address directing the web browser 482 to a server 470, and the web browser 482 may generate a Hyper Text Transfer Protocol (HTTP) request and communicate the HTTP request to server 470. Server 470 may accept the HTTP request and communicate to client 480 one or more Hyper Text Markup Language (HTML) files responsive to the HTTP request. Client 480 may render a web page based on the HTML files from server 470 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JavaScript, Java, Microsoft Silverlight™, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 482 may be adapted for the type of client 480 where the web browser executes. For example, a web browser residing on a desktop computer may differ (e.g., in functionalities) from a web browser residing on a mobile device. A user of a social networking system may access the website via web browser 482.

Figure 9:
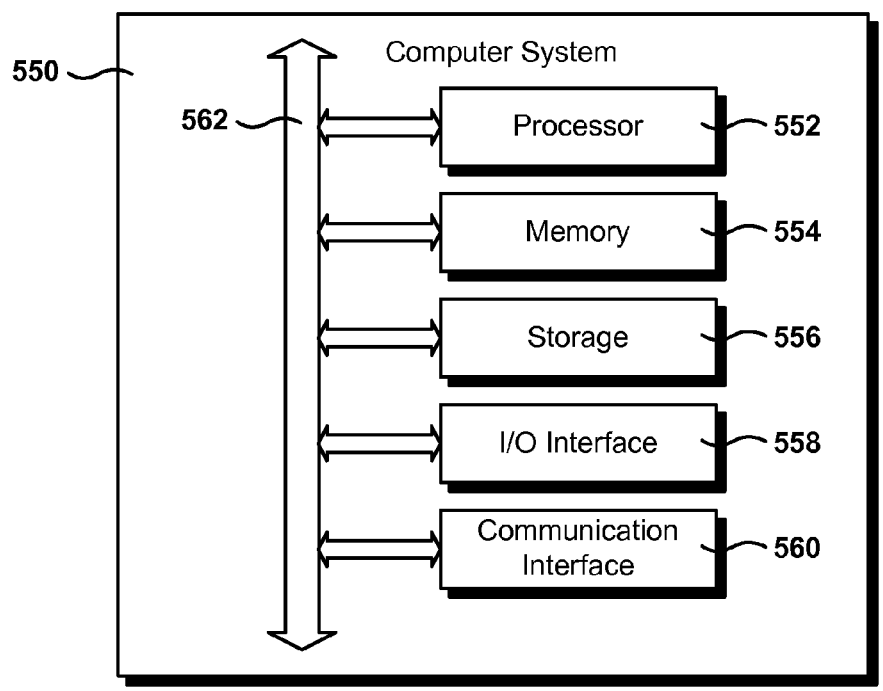
FIG. 9 illustrates an example computer system for implementing embodiments of the present invention.

FIG. 9 illustrates an example computer system 550 for implementing embodiments of the invention. In one embodiment, the computer system 550 is an example of a client device, such as the client device A, B, C, D, E, or F (FIG. 1). In other embodiments, the computer system 550 is an example of the server 102 (FIG. 1). In some embodiments, software running on one or more computer systems 550 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 550 may be an embedded computer system, a system-on-chip (SOC), a single-board computer system (SBC) (such as, for example, a client device, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 550 may include one or more computer systems; be standalone or distributed; span multiple locations; span multiple machines; or reside in a cloud, which may include one or more cloud components in one or more networks. The one or more computer systems may perform in real time or in batch mode one or more operations of one or more methods described or illustrated herein.

In particular embodiments, computer system 550 includes a processor 552, memory 554, storage 556, an input/output (I/O) interface 558, a communication interface 560, and a bus 562. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 552 includes hardware for executing instructions, such as those making up a computer program. As an example and not by way of limitation, to execute instructions, processor 552 may retrieve (or fetch) the instructions from an internal register, an internal cache, memory 554, or storage 556; decode and execute them; and then write one or more results to an internal register, an internal cache, memory 554, or storage 556. The present disclosure contemplates processor 552 including any suitable number of any suitable internal registers, where appropriate. Where appropriate, processor 552 may include one or more arithmetic logic units (ALUs); be a multi-core processor; or include one or more processors 552. Although this disclosure describes and illustrates a particular processor, this disclosure contemplates any suitable processor.

In particular embodiments, memory 554 includes main memory for storing instructions for processor 552 to execute, or data that can be manipulated by processor 552. As an example and not by way of limitation, computer system 550 may load instructions from storage 556 or another source (such as, for example, another computer system 550) to memory 554. Processor 552 may then load the instructions from memory 554 to an internal register or internal cache. During or after execution of the instructions, processor 552 may write one or more results (which may be intermediate or final results) to the internal register or internal cache. Processor 552 may then write one or more of those results to memory 554. One or more memory buses (which may each include an address bus and a data bus) may couple processor 552 to memory 554. Bus 562 may include one or more memory buses, as described below. One or more memory management units (MMUs) reside between processor 552 and memory 554 and facilitate accesses to memory 554 requested by processor 552. Memory 554 includes random access memory (RAM).

As an example and not by way of limitation, storage 556 may include a hard disk (HD), a floppy disk, a flash memory, an optical disc, a magneto-optical disc, a magnetic tape, or a combination of two or more of these. Storage 556 may include removable or non-removable (or fixed) media, where appropriate. In particular embodiments, storage 556 includes a ROM. Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 558 includes hardware, software, or both providing one or more interfaces for communication between computer system 550 and one or more I/O devices. One or more of these I/O devices may enable communication between a user and computer system 550. As an example and not by way of limitation, an I/O device may include an input device, an output device, or a combination thereof. Examples of the I/O device include a keyboard, a keypad, a microphone, a monitor, a mouse, a printer, a scanner, a speaker, a still camera, a stylus, a touch screen, a trackball, or a combination of two or more of these.

Communication interface 560 includes hardware, software, or both providing one or more interfaces for communication between computer system 550 and one or more other computer systems 550 on one or more networks. As an example and not by way of limitation, communication interface 560 may include a network interface controller (NIC) or network adapter for communicating with an Ethernet or other wire-based network or a wireless NIC (WNIC) or wireless adapter for communicating with a wireless network, such as a Wi-Fi™ network. As an example, computer system 550 may communicate with a wireless personal area network (WPAN) (such as, for example, a Bluetooth WPAN), a Wi-Fi™ network, a worldwide interoperability for microwave access (WiMAX) network, a cellular telephone network (such as, for example, a Global System for Mobile Communications (GSM) network), or other suitable wireless network or a combination of two or more of these. As another example, the communication interface 560 includes a network interface card or a modem.

In particular embodiments, bus 562 includes hardware, software, or both coupling components of computer system 550 to each other. As an example and not by way of limitation, bus 562 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an Infiniband interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 562 may include one or more buses, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program, a module, information, bit stream, identifier, signature, context object, client state, or data. As an example and not by way of limitation, a computer-readable storage medium may include a semiconductor-based or other integrated circuit (IC) (such, as for example, a field-programmable gate array (FPGA) or an ASIC), a hard disk, an optical disc, a magneto-optical disc, a floppy disk, a magnetic tape, a holographic storage medium, a solid-state disk (SSD), a RAM, a Secure Digital card, or another suitable computer-readable storage medium or a combination of two or more of these, where appropriate. In some embodiments, any of the functions described herein are stored on one or more computer-readable storage media that is accessed by one or more processors to perform the functions.

In one embodiment, a module, as used herein, is embodied as computer-readable code on a computer readable storage medium. The computer-readable storage medium is any data storage device or a memory device that can store data, which can be thereafter be read by a computer. Examples of the computer-readable storage medium include hard drives, network attached storage (NAS), ROM, random-access memory, compact disc-ROMs (CD-ROMs), CD-recordables (CD-Rs), CD-rewritables (RWs), magnetic tapes and other optical and non-optical data storage devices. In some embodiments, the computer-readable storage medium can be distributed over a network-coupled computer system so that the computer readable code is stored and executed in a distributed fashion.

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

With the above embodiments in mind, it should be understood that the embodiments can employ various computer-implemented operations involving data stored in computer systems. These operations are those requiring physical manipulation of physical quantities. Any of the operations described herein that form part of the embodiments of the present invention are useful machine operations. The embodiments of the present invention also relate to a device or an apparatus for performing these operations. The apparatus can be specially constructed for a specific purpose. The apparatus is selectively activated or configured by a computer program stored in the computer.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method comprising:
receiving a read request from a first client;
sending a last known signature with a first context object to the first client in response to receiving the read request;
receiving an appended signature from the first client with a second context object for a transaction at the first client, the appended signature including the last known signature and an increment by the first client, wherein receiving the appended signature occurs upon execution of the transaction at the first client;
updating the last known signature to the appended signature;
sending the updated last known signature to the first client to facilitate marking of the transaction as complete;
receiving a read request from a second client other than the first client; and
sending the updated last known signature with the second context object to the second client in response to receiving the read request from the second client.

2. The method of claim 1, further comprising:
losing access to the first client after sending the updated last known signature;
gaining access to the first client after losing access to the first client;
receiving an additional read request from the first client after gaining access to the first client; and
sending the updated last known signature with the second context object in response to receiving the additional read request, wherein sending the updated last known signature is performed to facilitate marking the transaction as complete.

3. The method of claim 2, further comprising:
receiving an appended signature from the second client with a third context object upon execution of a transaction at the second client, the appended signature that is received from the second client includes the updated last known signature and an increment by the second client; and
modifying the updated last known signature to match the appended signature that is received from the second client; and
sending the modified last known signature to the second client to facilitate marking of the transaction at the second client as complete.

4. The method of claim 1, further comprising:
receiving an appended signature from the second client with a third context object upon execution of a transaction at the second client, the appended signature that is received from the second client includes the updated last known signature and an increment by the second client; and
modifying the updated last known signature to match the appended signature that is received from the second client; and
sending the modified last known signature to the second client to facilitate marking of the transaction at the second client as complete.

5. The method of claim 4, wherein the second client includes a client device or a game application.

6. The method of claim 4, wherein the second client includes a combination of a client device and a gaming service.

7. The method of claim 1, wherein the appended signature distinguishes the transaction and the first client from a transaction performed at the second client and the second client.

8. The method of claim 1, wherein the first client includes a client device or a gaming application.

9. The method of claim 1, wherein the appended signature distinguishes the first client from the second client.

10. The method of claim 1, wherein the first client includes a combination of a client device and a game application.

11. A method comprising:
sending a read request to a server;
receiving, at a first client, a last known signature with a first context object from the server in response to sending the read request;
determining whether a transaction is performed;
sending an appended signature with a second context object to the server in response to determining that the transaction is performed, the appended signature including the last known signature and an increment by the first client; and
determining whether the appended signature is received from the server,
the server receiving a read request from a second client other than the first client, and the server sending the appended signature with the second context object to the second client in response to receiving the read request from the second client.

12. The method of claim 11, further comprising marking the transaction as complete in response to determining that the appended signature is received from the server.

13. The method of claim 12, further comprising updating the last known signature to the appended signature upon marking the transaction as complete.

14. The method of claim 11, further comprising:
sending an additional read request;
receiving an updated last known signature with the second context object from the server in response to sending the additional read request;
comparing the updated last known signature with the appended signature;
updating the last known signature at the first client to match the updated last known signature in response to determining based on the comparison that a lack of the match between the updated last known signature and the appended signature exists; and
marking the transaction as complete upon updating the last known signature at the first client to match the updated last known signature.

15. The method of claim 11, further comprising:
sending an additional read request;
receiving the last known signature with the second context object from the server in response to sending the additional read request;
comparing the last known signature with the appended signature; and
determining that there is a lack of match between the last known signature and the appended signature.

16. The method of claim 15, further comprising:
sending the appended signature with the second context object to the server in response to determining that there is a lack of match between the last known signature and the appended signature;
receiving an updated last known signature in response to sending the appended signature;
comparing the updated last known signature with the appended signature; and
marking the transaction as complete in response to determining that the updated last known signature matches the appended signature.

17. A method comprising:
sending a read request to a server;
receiving a last known signature with a first context object in response to sending the read request;
determining whether a transaction is complete at a first client;
adding an increment signature to the last known signature after determining the transaction is complete, wherein adding the increment is performed to generate an appended signature; and
sending the appended signature with a second context object to the server,
the server receiving a read request from a second client other than the first client, and the server sending the appended signature with the second context object to the second client in response to receiving the read request from the second client.

18. The method of claim 16, further comprising:
determining whether an updated last known signature received by the first client matches the appended signature; and
marking the transaction as complete at the first client upon determining that the updated last known signature matches the appended signature.

19. The method of claim 17, further comprising:
sending the appended signature with the second context object in response to determining that there is a lack of match between a signature received by the first client from the server and the appended signature;
receiving an updated last known signature from the server;
comparing the updated last known signature with the appended signature; and
determining that the transaction is complete in response to determining that the updated last known signature matches the appended signature.

20. The method of claim 17, wherein the appended signature distinguishes the first client from a second client.

* * * * *